United States Patent [19]
Bolton et al.

[11] 3,917,543

[45] Nov. 4, 1975

[54] METHOD FOR PREPARING ZEOLITE-BASED CATALYST COMPOSITION

[75] Inventors: Anthony P. Bolton, Bardonia; Donald F. Best, Mahipac; Herbert C. Shaw, Spring Valley, all of N.Y.

[73] Assignee: Union Carbide Corporation, New York, N.Y.

[22] Filed: Feb. 16, 1972

[21] Appl. No.: 226,932

[52] U.S. Cl............................ 252/455 Z; 252/455 Z
[51] Int. Cl.²......................................... B01J 29/06
[58] Field of Search......... 252/455 Z; 423/112, 118, 423/328

[56] References Cited
UNITED STATES PATENTS 3,365,392   1/1968   Mitsche et al.................. 252/455 Z
3,457,191   7/1969   Erickson et al................. 252/455 Z
3,546,137   12/1970  Gladrow et al................. 252/455 Z

*Primary Examiner*—Carl F. Dees
*Attorney, Agent, or Firm*—R. G. Miller

[57] ABSTRACT

Zeolite-based hydrocracking catalysts having a low residual sodium content achieved by ammonium cation exchange are loaded with a hydrogenation agent comprising a mixture of a Group VIII non-noble metal and a Group VI-B metal by a process which avoids to a high degree loss of effective catalytic surface area. The use of an ammonium ion exchange medium having a pH value within critical limits for the second of two necessary cation exchange procedures is an essential feature of the process.

1 Claim, No Drawings

METHOD FOR PREPARING ZEOLITE-BASED CATALYST COMPOSITION

The present invention relates in general to hydrocarbon conversion catalysts and more particularly to a method for preparing zeolitic hydrocracking catalysts.

Numerous catalyst compositions have heretofore been proposed for use in hydrocarbon conversion processes which comprise a combination of a crystalline zeolitic molecular sieve and a catalytically active metal or metal compound. Such dual functional catalysts are particularly useful in those conversion processes such as hydrocracking, which involve hydrocarbon conversions in the presence of a reducing atmosphere of hydrogen. The metal components of the catalysts are frequently selected from the noble metals of Group VIII of the Periodic System, but non-noble metals, particularly those of Group VIII and Group VI, have also been employed instead of, or in addition to, the more expensive platinum group metals. Commonly, a mixture of non-noble metals is used as the hydrogenation agent as is disclosed in U.S. Pat. No. 3,549,518; U.S. Pat. No. 3,159,564 and U.S. Pat. No. 3,265,610. Consistent with conventional usage in the art, the term "metal hydrogenation agent" as used herein is inclusive of active compounds of the metals, particularly the oxides, as well as the elemental metal per se.

A variety of techniques have been used to achieve an intimate mixture of the finely divided metal hydrogenation agent with the zeolite component of the overall catalyst composition. Among these are (1) impregnation using an aqueous solution of a suitable metal compound followed by drying and thermal or chemical decomposition of the metal compound; (2) adsorption of a fluid decomposable compound of the metal followed by thermal or chemical decomposition of the metal compound; (3) cation exchange using an aqueous solution of a suitable metal salt followed by chemical reduction of the cations; (4) cation exchange using an aqueous solution of a suitable metal compound in which the metal is in the cationic state with coordination complexing agents followed by thermal or chemical decomposition of the cationic complex. Methods (1), (2) and (3) are conveniently employed to introduce metals such as copper, silver, gold, cadmium, iron, cobalt and nickel while methods (1), (2) and (4) are suitable for introducing the platinum and palladium group metals. Method (2) is suitable for introducing metals such as titanium, chromium, molybdenum, tungsten, rhenium, manganese, zinc and vanadium.

The impregnation method (1) is practiced in any way that does not destroy the essential structure of the crystalline zeolitic aluminosilicate. Impregnation differs from the other loading methods in that the metal is commonly in the anionic part of a water soluble compound and thus is only deposited on the external surfaces of the zeolite. In preparing the catalyst, a water soluble compound of the metal, such as a Group VIII metal, in an amount sufficient to contain the quantity of metal desired in the finally prepared catalyst product is dissolved in water and mixed with the crystalline zeolite. The zeolite is then dried and heated to a temperature sufficient to thoroughly remove the water leaving the metal of the compound in a uniform deposit. Further heating may in some instances be required to convert the metal to its active state, such as heating in hydrogen or other reducing atmospheres.

Method (2) provides a means for depositing the active metals in the inner adsorption region of the molecular sieves. The zeolite is first activated to remove any adsorbed water and then contacted with a fluid decomposable compound of the metal thereby adsorbing the compound into the sieve. Typical of such compounds are the metal carbonyls, metal alkyls, volatile metal halides and the like. The internally adsorbed compound is then reduced thermally or chemically to its elemental metal thus leaving an active metal uniformly dispersed throughout the internal adsorption region of the molecular sieve.

The ion-exchange methods (3) and (4) differ since (3) relates to the use of metal salts such as the chlorides and nitrates of the iron group metals, wherein the metal itself is that cation, whereas (4) relates to the use of compounds of metals, such as the platinum and palladium group metals, in which the metal is contained in the cationic portion of the compound in coordination complex form.

In the broad sense, the composite catalysts resulting from application of all of the aforesaid methods are the same, i.e., a distribution of a catalytically active metal on a zeolite base is obtained. Nevertheless, in almost all instances, differences in the fine structure resulting from the particular method employed cause significant differences in the catalytic activity of the final composite catalyst. These differences arise not only from the varying degrees of dispersion of the metal on the zeolite, but also from changes in the zeolite structure itself arising from thermal treatment and/or chemical reactions directly or indirectly resulting from contact with the precursor of the metal hydrogenation agent ultimately deposited on or in the zeolite.

It is found, moreover, that certain zeolite forms are much more sensitive to the manner in which they are combined with metal hydrogenation agents than others. The preparation of one such class of zeolite catalysts is the object of the present invention. This catalyst composition can be described as comprising a crystalline zeolitic molecular sieve having the characteristic crystalline structure of zeolite Y, having less than 10 equivalent percent alkali metal cations, and having at least 70 percent of its framework aluminum atoms unassociated with metal cations, said zeolite being in intimate admixture with an alumina adjuvant and a hydrogenation component comprising a mixture of at least one Group VIII non-noble metal and at least one Group VI-B metal.

The object of this invention is accomplished by the process which comprises a. providing a zeolite Y molecular sieve having a $SiO_2/Al_2O_3$ molar ratio of at least 4.0, an alkali metal cation content of from about 10 to about 30 equivalent percent and complementarily from about 90 to about 70 equivalent percent non-metallic cations;

b. heating said molecular sieve at a temperature of from 350°C. to below the crystalline destruction temperature for a period of at least 0.1 hr., said heating within the said temperature range being the first such heating to which the molecular sieve in its present cation form has been subjected;

c. cooling the decationized molecular sieve to less than 300°C. and contacting same with an aqueous ammonium ion solution to reduce the alkali metal cation content by ion exchange to less than 10 equivalent percent alkali metal cations, the pH of the said ammonium ion solution in contact with said molecular sieve being in the range of 4 to 8;

d. thereafter forming a composition by intimately admixing the resulting molecular sieve product with finely divided alumina, an alkali metal-free water soluble salt of at least one non-noble metal of Group VIII of the Periodic System, at least one water soluble alkali metal-free compound of a metal of Group VI-B of the Periodic System and water, said Group VI-B metal being present in an amount of from 10 to 30 weight percent calculated as the metal oxide based on the weight of $Al_2O_3$ + zeolite present (solids basis), said Group VIII metal being present in an amount of from 2 to 10 weight percent calculated as the metal oxide based on the weight of $Al_2O_3$ + zeolite present (solids basis), and said water being present in an amount sufficient to render said composition a thixotropic extrudable mass; and e. extruding the composition thus formed and at least partially dehydrating the extrudate.

The partially cation exchanged form of zeolite Y employed as the starting material is readily prepared from the sodium cation form of zeolite Y by conventional ion exchange techniques using a solution containing a relatively high concentration of hydrogen, ammonium, tetramethyl ammonium or other non-metallic cations thermally reducible to hydrogen cations. Zeolite Y and its preparation is defined and described in detail in U.S. Pat. No. 3,130,007. Ion exchange methods using non-metallic cation solutions are also described therein and in U.S. Pat. No. 3,130,006. It is important that the zeolite starting material has never previously been subjected to any heat treatment which would have been sufficient to cause deammination and consequent dehydroxylation. Each such dehydroxylation causes some degree of loss of crystalline structure when the zeolite is subjected to the further steps of the process of this invention. Accordingly, once the zeolite Y has been ion exchanged to replace the original alkali metal present in the as-synthesized form with non-metallic cations, it should not be heated above about 350°C. except as is consistent with the present process.

The primary purpose of the initial heating step [i.e., step (b), supra] is to facilitate reduction of the alkali metal cations of the starting material to at least less than 10 equivalent percent and preferably as low as is economically feasible in view of the intended final use of the catalyst product. Although it has been found that heating at 350°C. for at least 0.1 hr. is suitable for the intended purpose, it will be understood that an optimum correlation between temperature and heating period for a particular batch of starting material is readily arrived at by routine experimentation by those skilled in this art. There is no critical upper limit on the heating period, provided that the temperature employed is not sufficient to cause significant destruction of the zeolite.

After the heating of step (b) the succeeding ion exchange step, wherein additional alkali metal cations in the zeolite, should be replaced by ammonium cations is carried out at a temperature of from 0°C. to reflux temperature of the aqueous ion exchange medium and at pH conditions of between 4 and 8. It has clearly been demonstrated that the specified pH range is critical, particularly at the upper end of the range, and a substantial loss of surface area, and hence catalytic activity, is observable in the product catalyst if these limits are exceeded. For the ion exchange medium, ammonium chloride or ammonium nitrate are suitably employed or any other ammonium salt conventional for zeolite ion exchange. After the ion exchange step, it is advantageous to water wash the zeolite.

The proportions of the composition which is thereafter to be extruded in accordance with this invention is not narrowly critical. Depending on the intended application for the final catalyst, i.e., the nature of the hydrocarbon feedstock to be catalytically treated and the character of the conversion product, the proportion of the zeolite constituent can be varied over wide ranges. Ordinarily on a solids basis (weight after calcining to 1000°C.) the zeolite and the alumina will vary in proportions from 1:30 to 30:1.

The non-noble metals of Group VIII preferably employed are cobalt and nickel and the preferred salts of these metals are the water-soluble forms in which the cation is $Co^{++}$ or $Ni^{++}$ and the anion moiety is thermally decomposable to volatile components, such as the nitrates, carbonates, and oxalates of cobalt and nickel. The water-soluble salts of the Group VI-B metals, i.e., chromium, molybdenum and tungsten (especially the last two) are in the main the acid anhydrides, i.e., oxides and salts in which the Group VI-B metal moiety is present in the anion of the salt. As the cation portion of such salts for use in this invention, it is advantageous it be ammonium since extraneous metal values are not thereby introduced into the catalyst composition. Ammonium metatungstate and ammonium paramolybdate are preferred salts in the present process.

In preparing the final composition to be extruded, it is advantageous to peptize at least a portion of the alumina adjuvant with an acid such as nitric acid to facilitate the preparation of a homogenous composition. The quantity of water will of course vary with the relative proportions of the other ingredients, but should be only sufficient to form an easily extrudable mass having adequate green strength for further handling. The extrudate is prepared for catalytic use merely by drying and heating to remove the water of hydration of the zeolite. Temperatures of 250°C. are suitable for this purpose.

EXAMPLE I

A freshly prepared 500 gram lot of zeolite Y with a Si/Al molar ratio of 2.2 and from which 80% of its original sodium cation content had been exchanged for ammonium cations was thermally deamminated by heating at 400°C. for 1 hour under purging conditions and thereafter cooled to about 30°C. Portions of the deamminated product, each containing 100 grams on a solids basis (weight after firing at 1000°C.), were designated samples A, B and C respectively and were further treated as follows:

a. Sample A was slurried at reflux in one liter of aqueous 10% ammonium nitrate solution at a pH of 5 for a period of one hour and thereafter cooled and filtered. The treatment was repeated two more times.

b. Sample B was subjected to the same treatment as sample A, except that the pH of the aqueous ammonium nitrate solutions was adjusted to 8 by the addition of ammonium hydroxide.

c. Sample C was subjected to the same treatment as sample B, except that the pH of the ammonium nitrate solution was adjusted to 10.

Chemical analysis showed the sodium content (as $Na_2O$) of each of the treated samples to be less than 0.75 weight percent on a solids basis.

The crystallinity of the three samples, A, B and C, was determined by measuring their surface area by oxygen adsorption at 100 mm. Hg pressure and −183°C. after 16 hours activation at 400°C. at a vacuum of 5 microns. Samples A and B after treatment both exhibited an oxygen capacity of 29 weight percent based on their activated weight. Sample C, however, exhibited an oxygen capacity of only 23 weight percent following treatment. Thus, the crystallinity as measured by surface area is lowered more than 20 percent by the treatment at pH higher than 8.

EXAMPLE II

The overall process of the present invention is illustrated by the following procedure: 142 grams (110 grams, anhydrous basis) of boehmite type alumina were charged to a muller and peptized by gradually adding 124 ml. of an 8 percent aqueous nitric acid solution. Thereafter there was added to the muller 620 grams (477 grams anhydrous basis) of additional boehmite type alumina; 200 grams (147 grams anhydrous basis) of an ammonium cation exchanged zeolite Y having less than 10 equivalent percent sodium cations, a $SiO_2/Al_2O_3$ molar ratio of 4.6 and prepared in the same manner as the zeolite of Sample A of Example 1, supra; 214.7 grams ammonium paramolybdate (85% $MoO_3$); 253 grams nickel nitrate hexahydrate (25.7% NiO); and 99 grams of 85% orthophosphoric acid. After thorough mixing the plastic mass was extruded into one-eighth inch diameter cylindrical forms, dried and calcined at 550°C. for 2 hours. The product exhibited excellent catalytic activity in hydrocracking a petroleum feedstock.

EXAMPLE III 813 grams (600 grams anhydrous basis) of an ammonium cation exchanged zeolite Y having less than 10 equivalent percent $Na^+$ cations a $SiO_2/Al_2O_3$ molar ratio of 5.0 and prepared in the same manner as the zeolite of Sample A of Example 1 were charged to a muller; 116 grams of nickel nitrate hexahydrate and 32 grams of nickel carbonate were thoroughly mixed with the zeolite; 183 grams of ammonium para molybdate was added and thoroughly mixed; 260 grams (200 grams anhydrous basis) of boehmite alumina peptized with 590 grams of 17 percent nitric acid was added to the mix. After thorough mixing, the plastic mass was extruded into one-sixteenth inch diameter cylindrical forms, dried and calcined at 500°C. for 1 hour. The product exhibited excellent catalytic activity in hydrocracking a petroleum feedstock.

What is claimed is:

1. Process for preparing a conversion catalyst which comprises:
   a. providing a zeolite Y molecular sieve having a $SiO_2/Al_2O_3$ molar ratio of at least 4.0, an alkali metal cation content of from 10 to about 30 equivalent percent and complementarily from about 90 to about 70 equivalent percent non-metallic cations;
   b. heating said molecular sieve at a temperature of from 350°C. to below the crystalline destruction temperature for a period of at least 0.1 hr., said heating within the said temperature range being the first such heating to which the molecular sieve in its present cation form has been subjected;
   c. cooling the molecular sieve to less than 300°C. and contacting same with an aqueous ammonium ion solution to reduce the alkali metal cation content by ion exchange to less than 10 equivalent percent alkali metal cations, the pH of the said ammonium ion solution in contact with said molecular sieve being in the range of 4 to 8;
   d. thereafter forming a composition by intimately admixing the resulting molecular sieve product with finely divided alumina, an alkali metal-free water soluble salt of at least one non-noble metal of Group VIII of the Periodic System, at least one water soluble alkali metal-free compound of a metal of Group VI-B of the Periodic System and water, said Group VI-B metal being present in an amount of from 10 to 30 weight percent calculated as the metal oxide based on the total weight of $Al_2O_3$ plus zeolite present (solids basis), said Group VIII metal being present in an amount of from 2 to 10 weight percent calculated as the metal oxide based on the total weight of $Al_2O_3$ plus zeolite present (solids basis), and said water being present in an amount sufficient to render said composition a thixotropic extrudable mass; and
   e. extruding the composition thus formed and at least partially dehydrating the extrudate.

* * * * *